No. 757,822. PATENTED APR. 19, 1904.
E. P. F. MAGNIEZ.
COOLING APPARATUS.
APPLICATION FILED SEPT. 11, 1903.
NO MODEL. 3 SHEETS—SHEET 1.
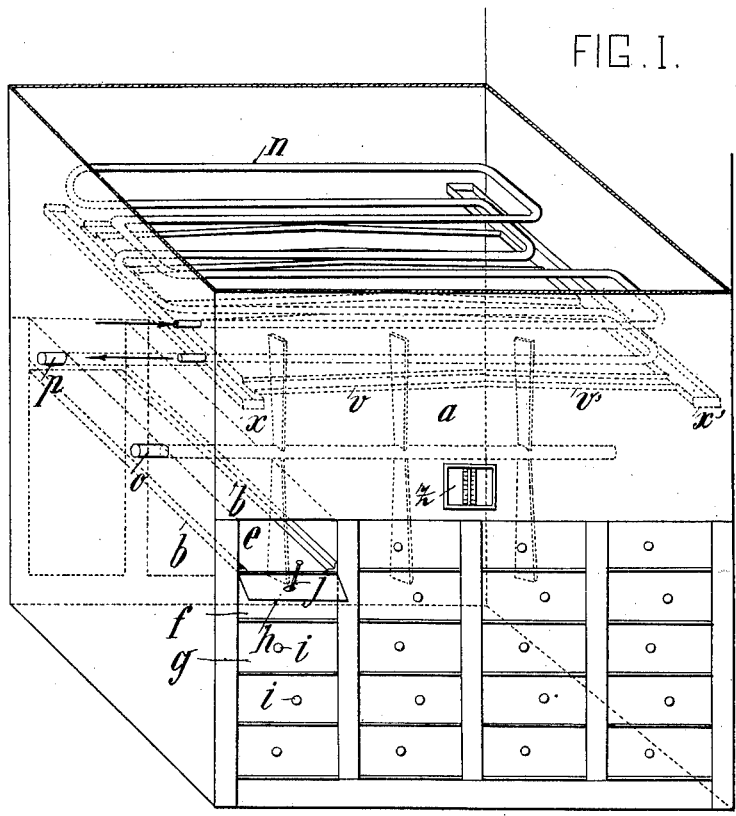
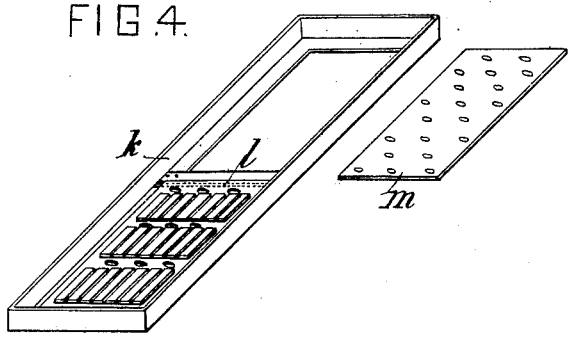
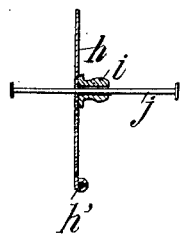
WITNESSES
Frank E. Boyce
Fred Holman
INVENTOR
Ernest Paul Frederic Magniez
BY
James Niles
ATTORNEYS No. 757,822. PATENTED APR. 19, 1904.
E. P. F. MAGNIEZ.
COOLING APPARATUS.
APPLICATION FILED SEPT. 11, 1903.
NO MODEL. 3 SHEETS—SHEET 2.

WITNESSES
Frank E. Boyce.
Fred Holman

INVENTOR
Ernest Paul Frederic Magniez
BY
Locwer Niles
ATTORNEYS

No. 757,822. Patented April 19, 1904.

UNITED STATES PATENT OFFICE.

ERNEST PAUL FREDERIC MAGNIEZ, OF AMIENS, FRANCE.

COOLING APPARATUS.

SPECIFICATION forming part of Letters Patent No. 757,822, dated April 19, 1904.

Application filed September 11, 1903. Serial No. 172,761. (No model.)

*To all whom it may concern:*

Be it known that I, ERNEST PAUL FREDERIC MAGNIEZ, a citizen of the Republic of France, and a resident of Amiens, France, have invented a new and useful Improvement in Cooling Apparatus, which improvement is fully set forth in the following specification.

This invention relates to an apparatus for cooling chocolate and the like previous to removing it from the molds.

After chocolate paste has been molded in a plastic state it must be cooled in order that it may be possible to remove it from the mold, chocolate bars or cakes during this cooling becoming solidified to the desired extent, owing to the contraction of their cocoa-butter contents. Various systems of cooling are at present in use, but they are generally costly and cumbersome and do not give perfectly satisfactory results by reason of their not allowing the use of a sufficiently-low temperature, the tablets being all submitted to a given temperature during the same period of time; but if it is impossible to withdraw at an earlier period a tablet which, owing to its smaller size, cools more quickly than others it will be readily understood that it is impossible to use a very low temperature, since the tablets which cool quicker will be of such temperature when removed that it will be impossible to bring them in contact with the atmospheric air without bringing about a condensation. In practice it is generally found inconvenient to go below a temperature of 12°.

The apparatus forming the object of the present invention is very compact, and owing to the method of charging and discharging it is possible to treat simultaneously cakes or tablets of different sizes while regulating, as desired, the time during which the cakes and tablets remain in the vat, according to their size and the temperature used. It is also possible to make use of very low temperature.

A vat according to this invention is illustrated, by way of example, in the accompanying drawings, in which—

Figure 2:
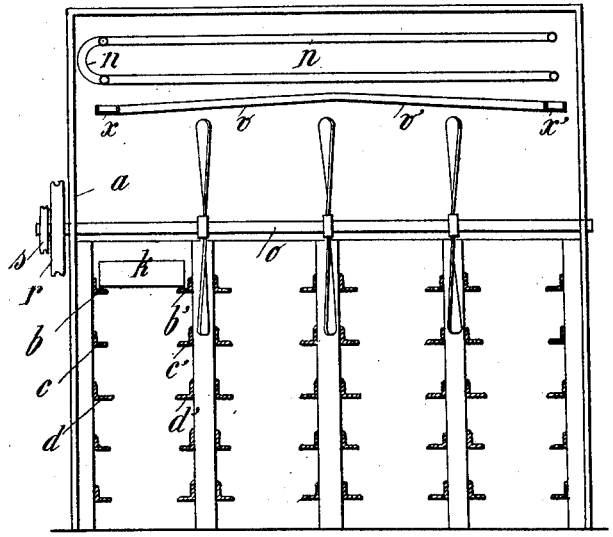
Figure 3:
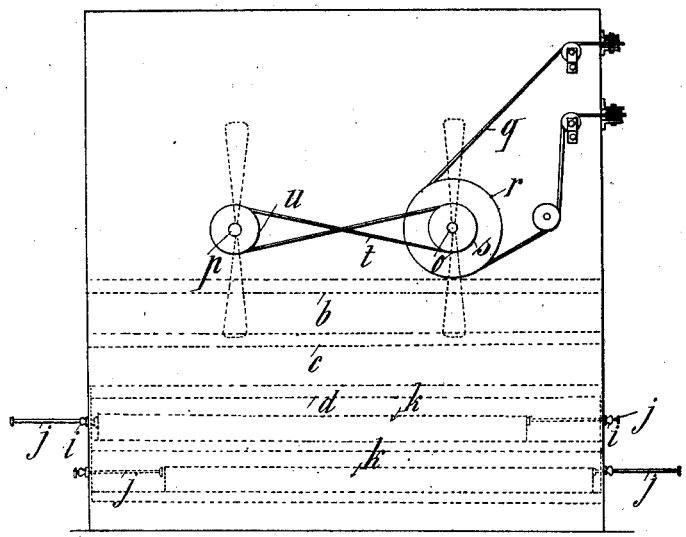
Figure 6:
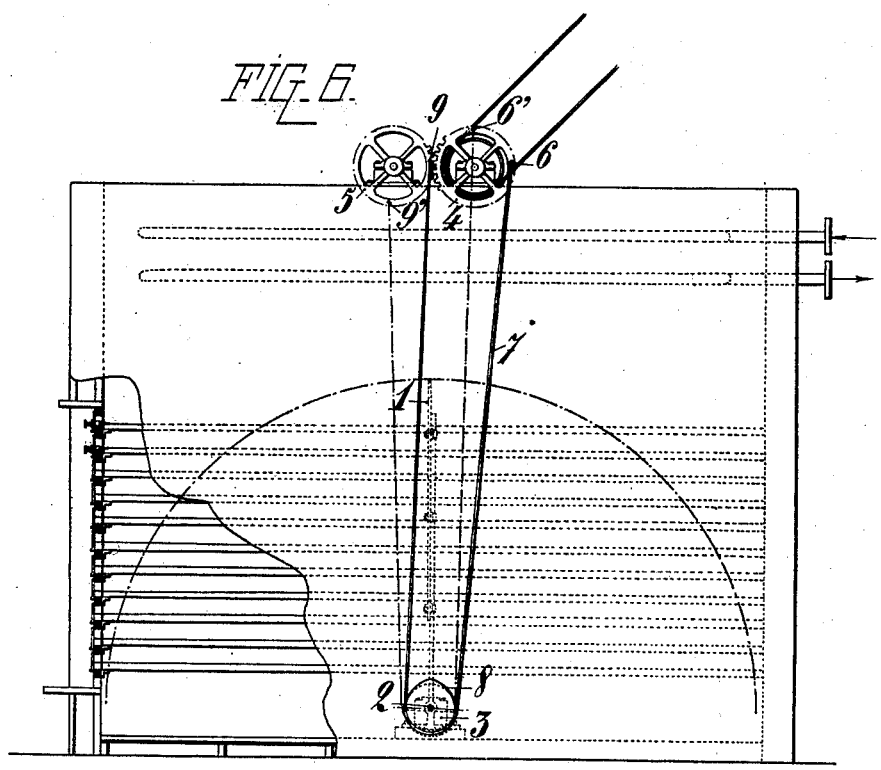
Figure 7:
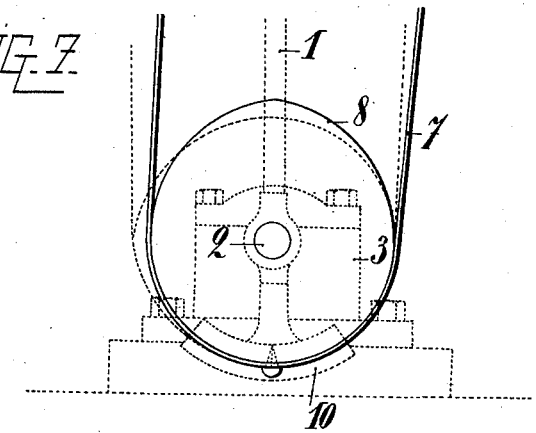

Figure 1 shows the whole vat in perspective, the upper portion being removed in order to render the cooling-coil visible. Fig. 2 is an elevation with the front wall of the vat removed. Fig. 3 is a side elevation of the apparatus. Figs. 4 and 5 are detail views. Figs. 6 and 7 show a modified construction.

The apparatus chiefly consists of a casing $a$, preferably of wood, rendered sufficiently airtight to prevent leakage of cold produced in the apparatus by the means hereinafter described. The bottom portion of the casing is provided with angle-irons $b\ b'$, $c\ c'$, $d\ d'$, &c., arranged in pairs across the apparatus in such manner that each pair connects a certain orifice or opening in the front face with a corresponding orifice in the rear. The orifices or openings $e\ f\ g$, &c., made in front faces are of exactly the same number, the same dimensions, and arranged on the same level as those in the back of the apparatus. These orifices are tightly closed on both sides of the apparatus by identical doors $h$, swinging about hinge-pins $h'$. The handling of these doors is facilitated by a knob $i$, through which passes a rod $j$, Fig. 5, freely moving inside the knob.

The angle-irons $b\ b'$, $c\ c'$, $d\ d'$, &c., are intended to form tracks or guideways for metallic cases or supporting-frames $k$, Fig. 4, the lateral walls of which consist of other angle-irons forming shoulders supporting two movable perforated metal sheets $l\ m$. These guide-rails are arranged in sets, one set for each supporting-frame, and one set is superposed on the other. The supporting-frames, one on each set of guide-rails, form tiers. The width of the frames $k$ is such that they can freely slide between the angle-irons $b\ b'$, $c\ c'$, $d\ d'$, &c., and their length is calculated so that when they have been introduced through the orifices or openings $e\ f\ g$ into the interior of the apparatus and the doors $h$ closed it should be possible to push the frames by means of the rods $j$, which results in bringing the back end of the case $k$ against the door of the opposite face corresponding to the inlet, the rods $j$, passing through the knobs $i$, being arranged at a suitable level, so as to strike the front and back walls of the case $k$. The rod $j$ of the corresponding back face is pushed outward.

The cooling in the apparatus is effected by means of a refrigerating fluid generated elsewhere and circulating in a coil *n*. The cold thus produced in the upper portion of the apparatus next to the coil is conveyed to the bottom portion by two series of fans, the spindles *o* and *p* of which are in the same horizontal plane and the blades of which rotate in the free space between the vertical series or tiers of angle-irons, guide-rails, and supporting-frames thereon. It will be understood that the number of fans must vary with the length of the apparatus. It will be readily understood that in spite of the large capacity of the apparatus by means of the number and the arrangement of the fans the chocolate tablets introduced into the apparatus in soft state are, so to say, plunged into the cold air which surrounds them as it circulates between the cases *k* and passes through the perforations of the bottom sheets *l m* of the said cases.

The fans may be driven in any desired manner. In the construction illustrated they are driven by an endless rope *q*, driven by an engine which may operate fans of several apparatus. This cable passes over a pulley *r*, Fig. 3, keyed to the spindle *o* of the first series of fans, which it drives direct. A second pulley *s*, secured to the spindle *o*, transmits by means of another cable or belt *t* and of a pulley *u*, keyed to the spindle *p* of the second series of fans, movement in the opposite direction, the cable or the belt *t* being crossed.

Another arrangement for conveying the cold from the top to the bottom of the apparatus could be advantageously used. Fig. 6 shows such modified construction, Fig. 7 being a detail view. This arrangement consists in replacing the two series of fans by a series of oscillating blades. These blades, the number of which, like the number of the fans, varies with the length of the apparatus, are arranged at the rate of one blade for each space between the vertical series of angle-irons. All these blades 1 are keyed to one spindle 2, supported in bearings 3 in the lower portion of the vat. An oscillating movement with an amplitude of one hundred and eighty degrees is given to the whole of the blades 1 by means of the following device:

At 4 and 5 are arranged, Fig. 6, two pinions engaging with each other, the pinion 4 being driven from the motor by means of a belt and pulleys. To the pinion 4 is connected at 6 the end of a steel cable or band 7, passing over a pulley 8, keyed to the spindle 2 of the blades. The other end of the steel cable or band 7 is connected at 9 to the pinion 5.

In Fig. 6 it will be seen how the circular movement of the pinions 4 and 5 is transformed into an oscillating movement of the blades. It will be readily understood that the rotation of the pinions results in displacing the points of attachment of the steel cable or band—that is to say, that 9 and 6 being at the dead-point, if the apparatus is thrown into gear the two points of attachment start to describe a complete circle, but one rises while the other descends during the first half-turn of the pinions 4 and 5. At the second half-turn of the said pinions the point of attachment, which was previously rising, descends, while the other point rises. The slackening of the cable 7, unavoidable in certain positions of the points of attachment—for instance, in the positions 6' and 9'—is compensated for by a deformation of the pulley 8, which is provided with a suitable projection. Therefore during one half-turn of the pinions 4 and 5 the whole of the blades oscillates, say, from right to left, and during the other half-turn from left to right. The movement of the blades is facilitated by one or several balance-weights 10, Fig. 7.

In order to obviate the drawback caused by the condensation of vapors from the air settling on the coil *n* and for preventing the drops thus formed from falling on the cases, gutters *v v'*, sloping in both directions, are arranged under each longitudinal portion of the coil, said gutters collecting the drops and discharging them into transverse collectors *x x'*, which facilitate the discharge of the water to the outside of the apparatus.

The walls of the vat can be provided with openings intended to facilitate access to it for the purpose of repairing or cleaning it. Moreover at *z* there is a glazed window which enables the interior of the apparatus, lighted by an electric lamp, to be seen. Behind the glass of the window *z* is a thermometer indicating the temperature of the vat.

Continuous working of the apparatus necessitates a number of frames *k* sufficient to fill it up completely. These frames are charged in the following manner: The workman half withdraws an empty frame *k*, pulls toward himself the back sheet or plate, provides it with molds, pushes it back, provides the front sheet or plate, pushes the frame, causing it to slide along the angle-irons, closes the door and pushes the needle or rod, which by pushing the frame as far as it will go causes the corresponding rod on the other side to come out, which indicates to the workman charged with taking out chocolate from the molds that this compartment is full.

The workman when he considers that a frame full of molds has been sufficiently long in the vat half pulls out the frame from the apparatus, removes the molds from the front sheet or plate, pulls out the back sheet or plate, which he replaces as soon as the molds have been withdrawn, pushes back the empty frame into its place, closes the door, and by means of the rod pushes the frame to the desired extent, so as to cause the corresponding rod on the other side to come out, which will show to the charging workman that the compartment is empty. It will thus be seen that the apparatus works in a continuous manner and that its output is unlimited, as it only depends on the size of the apparatus and on the supply of material.

I claim as new and desire to secure by Letters Patent—

1. A cooling apparatus, comprising a casing having its front and rear walls provided with a plurality of openings, a plurality of guide-rails arranged in said casing, one set for each opening, supporting-frames movable on the guide-rails from the front to the rear of the casing, doors, one for each opening, and signaling means on said doors actuated by the supporting-frames, substantially as set forth.

2. A cooling apparatus, comprising a casing having its front and rear walls provided with a plurality of openings, a plurality of guide-rails arranged in said casing, one set for each opening, supporting-frames movable on the guide-rails from the front to the rear of the casing, hinged doors, one for each opening, knobs on said doors, and rods movable in said knobs, substantially as set forth.

3. A cooling apparatus, comprising a casing having its front and rear walls provided with a plurality of openings, a plurality of guide-rails arranged in said casing, one set for each opening, and one set superposed on the other forming tiers, supporting-frames movable on the guide-rails from the front to the rear of the casing, doors for said openings, means arranged in the upper part of the interior of the casing for cooling the air, and means arranged between the adjacent tiers of the supporting-frames for circulating the air in the casing, substantially as set forth.

In testimony whereof I have signed this specification in the presence of two subscribing witnesses.

ERNEST PAUL FREDERIC MAGNIEZ.

Witnesses:
EMILE LEDRET,
PAUL F. PÁQUET.